(No Model.)

A. J. APGAR.
CHURN DASHER.

No. 461,410. Patented Oct. 13, 1891.

Witnesses:
E. McWhinney
George H. White

Inventor
Andrew J. Apgar.
By Detriel J. Cilley
Attorney

UNITED STATES PATENT OFFICE.

ANDREW J. APGAR, OF GRAND RAPIDS, MICHIGAN, ASSIGNOR OF ONE-HALF TO DELBERT STONEHOUSE, OF SAME PLACE.

CHURN-DASHER.

SPECIFICATION forming part of Letters Patent No. 461,410, dated October 13, 1891.

Application filed September 13, 1890. Serial No. 364,908. (No model.)

*To all whom it may concern:*

Be it known that I, ANDREW J. APGAR, a citizen of the United States, residing at the city of Grand Rapids, in the county of Kent and State of Michigan, have invented a new and useful Improvement in Churn-Dashers, of which the following is a specification.

My invention relates to an improvement in dashers for use in dairy-churns for extracting butter from milk or cream; and its objects are, first, to provide a churn-dasher that will lessen the time and labor of producing butter; and, second, to provide a churn-dasher that may be applied to any form of dairy-churn. I attain these objects by the mechanism illustrated in the accompanying drawings, in which—

Figure 1:
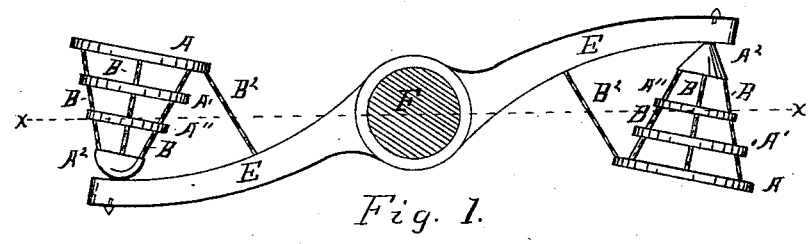
Figure 2:
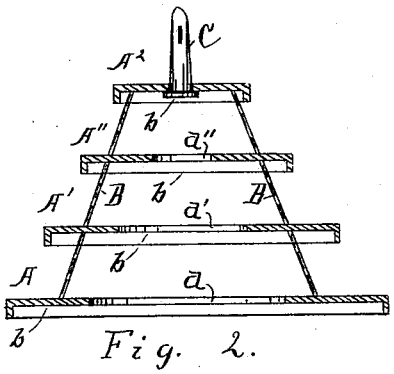

Figure 1 is an elevation of my dasher upon arms showing a concavo-convex and a funnel-shaped upper plate, and Fig. 2 is a transverse vertical section of one of the dashers, showing the central openings and the bolt or shank for fastening it to the arm.

Similar letters refer to similar parts throughout the several views.

I make my dashers in the form of cones, consisting of a series of several plates A A', &c., constructed with a large plate at its bottom and several decreasing uniformly in size above and supported by means of braces B, securely attached to each plate, so as to hold them firmly in position. The top plate of the series is made solid across its entire surface, and each plate below is provided with an opening through the center equal in size to about one-half the diameter of the plate, thus making the variations in the sizes of the openings to correspond with the variation of the sizes of the plates forming the cones, as shown by $a$ $a'$ $a''$ in Fig. 2. These plates may be made from heavy tin, zinc, sheet-iron, or any other suitable material.

I find it advantageous to construct the plates with a downwardly-projecting flange $b$, so that when they are brought down upon the cream they will tend, first, to force a quantity of air into it; and, second, to guide the cream to the center opening and force it through so that it will come forcibly in contact with the lower surface of each successive plate where it projects over the opening in the center of the preceding one, and will tend to cut or break the outward flow of the cream as it rushes from between them.

My object in making my complete dasher in the form of cones, with the plates decreasing uniformly in size toward the top, is that as each successive plate enters the cream it breaks the surface of the cream upon a smaller circle, which in connection with the outflowing current of cream from between each pair of plates separates the oily from the serous or curdy portion of the cream much more readily than a single plate or a series of plates of uniform size would do.

To attach my dashers upon rotary churns I place the arms E E upon the central shaft and secure one or more of my cones to each arm in position, so that the plates will approach the surface of the cream as nearly parallel as possible and support its cones by braces $B^2$, attached at one end to the lower plates of the cones and at the other ends to the arms E.

My object for not making an opening through the top plate of the cone is to provide a solid resisting surface that will come in contact with the cream after it has passed through the openings in the lower plates, by means of which it is forced downward and made to rush outward between the several plates with sufficient force to thoroughly stir the entire body of cream that is in the churn, and for this purpose I find it better to make the downwardly-projecting flange $b$ upon this plate deeper than the flanges upon the other plates, and I sometimes make use of a hollow cone or its equivalent, an inverted bowl instead of a plain plate for the upper plate of the dasher, as it forms a more perfect air-cushion, forces more air through the cream, forces the cream out between the several plates of the dasher toward the periphery of the churn with greater force and agitates the cream more thoroughly, which greatly facilitates the separation of the oily from the serous or curdy portion of the cream and produces a larger amount and a better grade of butter from the same cream than other forms of dashers will do.

What I do claim as new, and desire to secure by Letters Patent of the United States, is—

The combination, with a conical-shaped churn-dasher, of disk-shaped plates having holes through their centers and their outer rims turned down, a solid disk-shaped upper plate, braces passing through and attached to the plates, arms for supporting the dashers, the several plates of the dashers aranged to stand at various angles with said arms, braces for supporting the dashers, and a central shaft, substantially as specified.

ANDREW J. APGAR.

In presence of—
ITHIEL J. CILLEY,
GEORGE RUSSELL.